United States Patent [19]

Morino et al.

[11] Patent Number: 5,026,962
[45] Date of Patent: Jun. 25, 1991

[54] WIRE CUTTING ELECTRIC DISCHARGE MACHINE

[75] Inventors: Asami Morino; Masahito Umetsu, both of Kanagawa, Japan

[73] Assignees: Amada Company, Limited; Amada Wasino Co., Ltd., both of Japan

[21] Appl. No.: 425,189
[22] PCT Filed: Feb. 10, 1989
[86] PCT No.: PCT/JP89/00136
§ 371 Date: Nov. 27, 1989
§ 102(e) Date: Nov. 27, 1989
[87] PCT Pub. No.: WO89/07505
PCT Pub. Date: Aug. 24, 1989

[30] Foreign Application Priority Data

Feb. 10, 1988 [JP] Japan .................. 63-29088

[51] Int. Cl.⁵ .............................. B23H 7/10
[52] U.S. Cl. ............................. 219/69.12
[58] Field of Search ............ 219/69.12; 192/58 B, 192/58 R

[56] References Cited

U.S. PATENT DOCUMENTS 4,278,157  7/1981  King .................. 192/58 R
4,627,523  12/1986  Light ................. 192/58 B
4,697,621  10/1987  Diessner et al. ....... 192/58 B
4,803,326  2/1989  Kiyoshi ............... 219/69.12

FOREIGN PATENT DOCUMENTS 53-132894  11/1978  Japan .
61-136732  6/1986  Japan .
300823  12/1988  Japan ................ 219/69.12

Primary Examiner—Geoffrey S. Evans
Attorney, Agent, or Firm—Wigman & Cohen

[57] ABSTRACT

A wire cutting electric discharge machine which carries out an electric discharge process on a workpiece using a wire electrode of normal diameter, for example, 0.1 mm or greater, can also be used with a fine wire electrode with a diameter of less than 0.1 mm. The fine wire electrode can only withstand a small tension because of its extremely small diameter, so that a wire disposal device for disposing a normal wire electrode cannot be used. Therefore, a wire disposal device for a fine wire electrode is provided adjacent to the lower wire guide device, and the force with which the wire is wound up by the wire disposal device is sufficiently smaller than the tension of the fine wire electrode, so that the wire disposal process does not produce breakage in the fine wire electrode. In addition, the lower wire guide device can be used in common for a normal wire electrode, and as required, can be changed for use with a fine wire electrode.

3 Claims, 4 Drawing Sheets

WIRE CUTTING ELECTRIC DISCHARGE MACHINE

FIELD OF THE INVENTION

The present invention relates to a wire cutting electric discharge machine wherein an electric discharge is produced between a wire electrode and a workpiece, the workpiece is moved relative to the wire electrode and the discharge process is carried out, and, in particular, to a wire cutting electric discharge machine wherein both a normal diameter wire electrode and a fine wire electrode with a diameter smaller than normal can be interchangeably used in the process.

An upper wire guide device positioned on the upper part of a workpiece which is to be processed, and a lower wire guide device positioned on the upper part of the workpiece are provided in a wire cutting electric discharge machine. In the wire cutting electric discharge machine, a discharge is produced between the wire electrode, guided by the upper and lower wire guide devices, and the workpiece. The workpiece is moved in a two-dimensional manner relative to the wire electrode and the electric discharge process is carried out on the workpiece.

Conventionally, when the discharge process is performed on the workpiece by a wire cutting electric discharge machine, a wire electrode is used which has a normal diameter, for example, 0.1 mm or greater. The wire electrode with a diameter of 0.1 mm or greater, after passing through the process area of the workpiece, is guided a comparatively long distance by means of guide rollers or the like, to a take-up reel provided on the body of the processing machine, or to a wire recovery box, or to a wire cutter position, and then the wire is wound upon the take-up reel, or is recovered in the wire recovery box, or is cut into short pieces by the wire cutter and then recovered in the wire recovery box 1, respectively.

However, when a high precision discharge process is to be carried out, for example, in the case where a fine wire electrode with a diameter less than 0.1 mm is used, the take-up tension must be rather weak in comparison with a wire electrode of normal diameter, for example, 0.1 mm or greater. However, when the fine wire electrode is wound up by means of a take-up device which is used to take up a normal wire electrode, tension fluctuations occur in the fine wire electrode and the take-up force becomes greater than the tension in the fine wire electrode, giving rise to the problem of breakage and the like being produced in the fine wire electrode.

In addition, a take-up device which takes up the normal wire electrode is placed in a position far removed from the lower wire guide device. Therefore, when the wire travel route is long, a large fluctuation is produced in the tension in the fine wire electrode so there are many factors which have an adverse effect on the process, and even a tension fluctuation which causes no problem with a normal wire electrode will give rise to processing problems with a fine wire electrode.

In view of the above problems, an object of the present invention is to provide devices, a wire cutting electric discharge machine wherein, when a discharge process is being carried out with a fine wire electrode on a workpiece, the wire travel route is drastically shortened so that fluctuations in the tension on the fine wire electrode are suppressed, making it possible to take up in a fine wire electrode under the uniform tension.

SUMMARY OF THE INVENTION

This object of the present invention is achieved by the provision of a device in a wire cutting electric discharge machine which disposes the portion of the wire electrode used for the electric discharge process with respect to the workpiece, basically comprising a wire electrode disposal device for disposing a wire electrode of normal diameter and a wire electrode disposal device for disposing a fine wire electrode. Accordingly, a fine wire electrode can be disposed by the latter electrode disposal device.

Also, in the present invention, the electrode disposal device for a fine wire electrode comprises a wire take-up device which can be coupled to the wire electrode disposal device for disposing of a wire electrode of normal diameter. The wire take-up device is provided adjacent to the wire guide device. The winding force of the take-up reel which takes up the fine wire electrode in the wire take-up device is weaker than the tension in the fine wire electrode. Accordingly, it is possible to perform the take-up process without producing breakage in the fine wire electrode. dr

DETAILED DESCRIPTION OF THE PREFERRED EMBODIMENTS

Hereinafter, a preferred embodiment of the present invention will be described with reference to the accompanying drawings.

Figure 4:
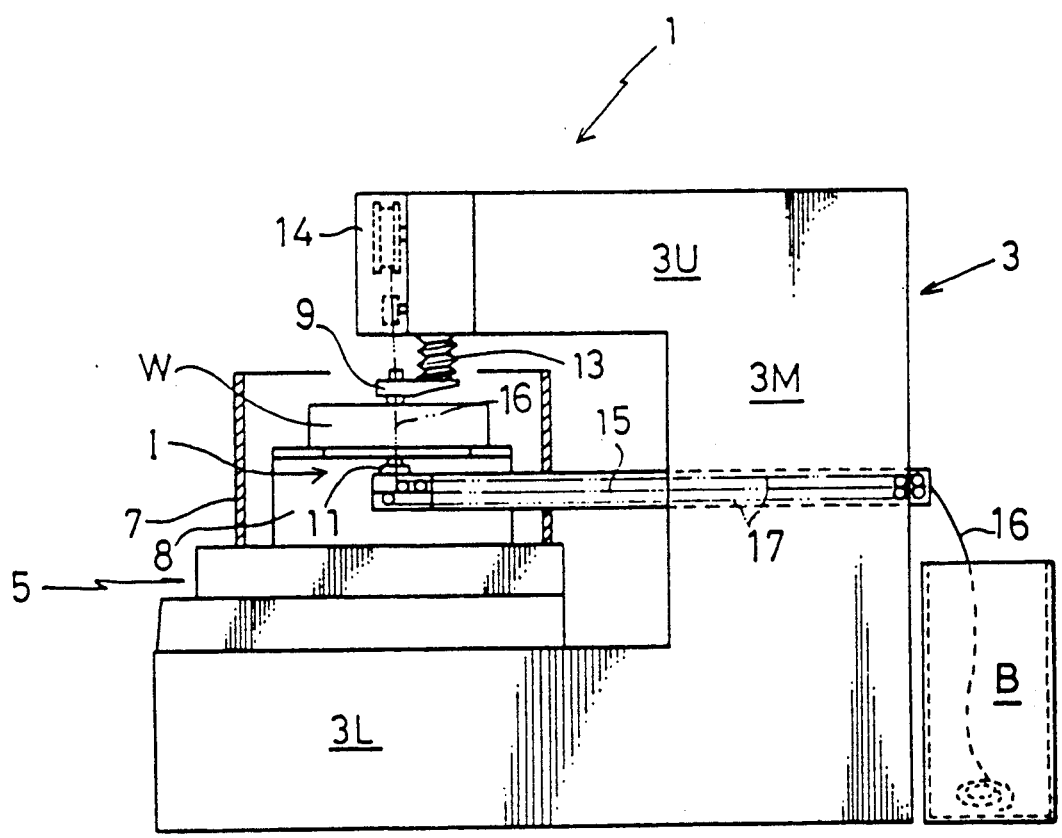
FIG. 4 is a general side elevation of a wire cutting electric discharge machine of one embodiment of the present invention.

Now referring to FIG. 4, a frame 3 of a wire cutting electric discharge machine 1 comprises an upper frame 3U, a lower frame 3L, and a middle frame 3M which connects the upper frame 3U and the lower frame 3L. A X, Y table 5 which is freely movable in the X and Y directions is provided on the lower frame 3L. A process liquid tank 7 is provided on the X, Y table 5. A work support table 8 which supports a workpiece W for processing is mounted on the inside of the process liquid tank 7.

An upper wire guide device 9 which also serves as an upper nozzle, and a lower wire guide device 11 which also serves as a lower nozzle are respectively positioned above and below the workpiece W. The upper wire guide device 9 is supported on a freely elevatable Z-axis column 13 mounted on the upper frame 3U. The lower wire guide device 11 is supported on the tip of a lower arm 15 of an angle pipe shape used as a support member, mounted horizontally on the middle frame 3M of the frame 3. A pair of upper and lower endless belts 17 are built into the lower arm 15. The endless belts 17 interposedly support and convey a wire electrode 16, acting as a wire electrode disposal device which disposes the wire electrode 16 as it moves from a wire electrode supply section 14 provided on the upper frame 3 via the upper wire guide device 9, the workpiece W, and the lower wire guide device 11. The endless belts 17 are driven by a motor (omitted from the drawing). The wire electrode 16 conveyed by the belts 17 is recovered in a recovery box B.

Figure 1:
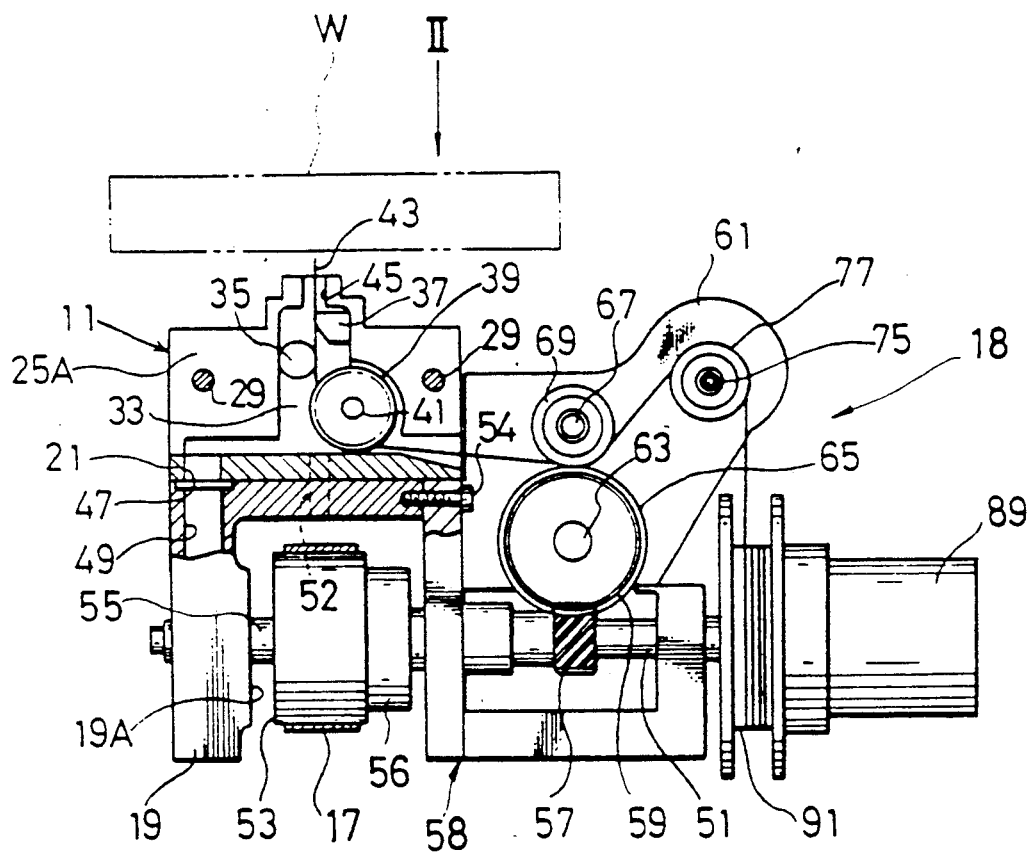
FIG. 1 is a drawing showing the main elements of a wire cutting electric discharge device in which the present invention is embodied, which corresponds to an enlarged drawing viewed in the direction of the arrow I in FIG. 4, and a sectional drawing viewed along the section I—I in FIG. 2.
Figure 2:
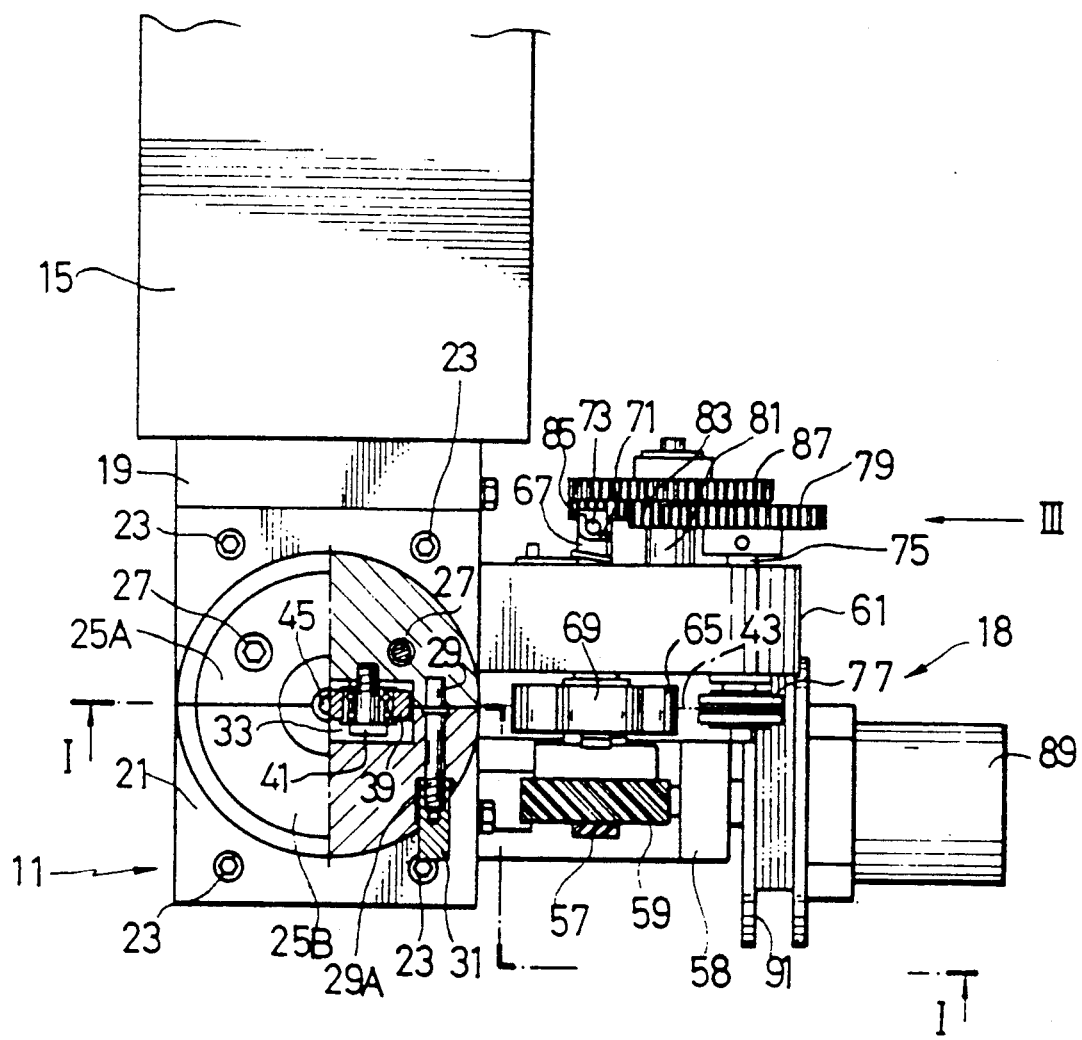
FIG. 2 is a part sectional drawing of a plan view, viewed in the direction of the arrow II in FIG. 1.
Figure 3:
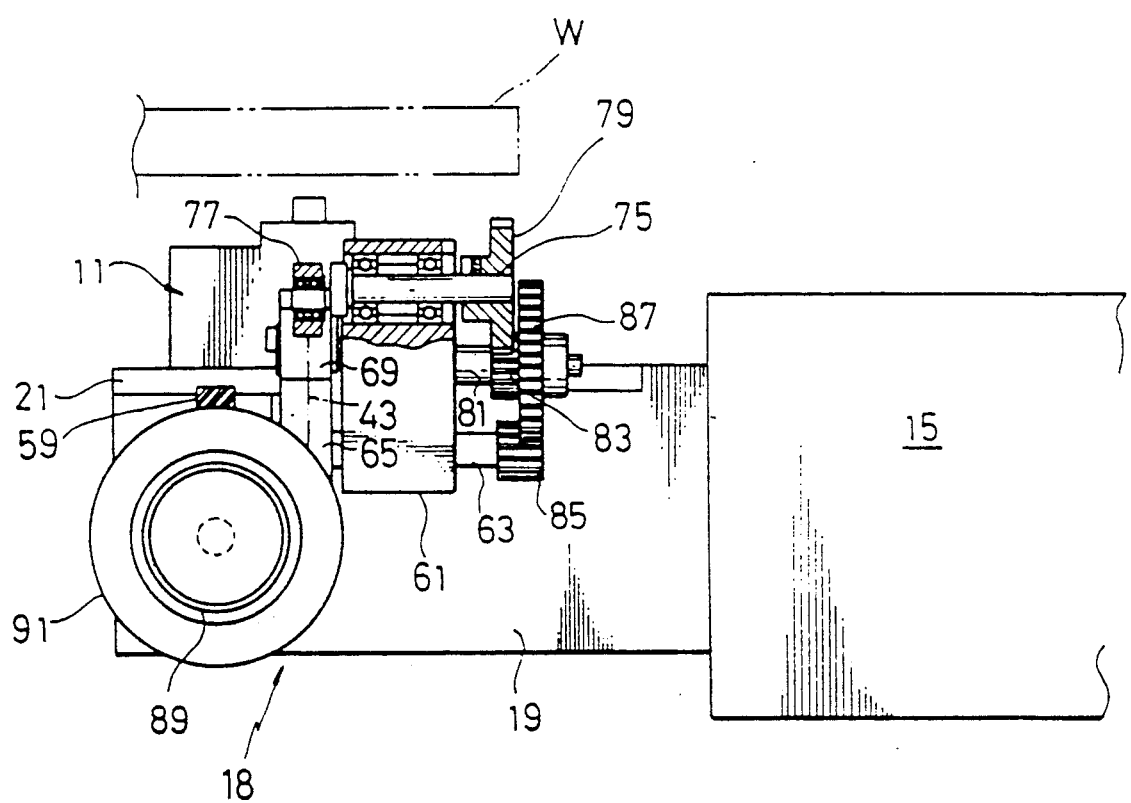
FIG. 3 is a part sectional drawing showing the right side elevation viewed in the direction of the arrow III in FIG. 2.

As shown in FIGS. 1, 2, and 3, a wire take-up device 18, which takes up a fine wire electrode 43 of a diameter smaller than the normal diameter wire electrode 16, is provided on the tip of the lower arm 15. In addition, it is desirable that the lower wire guide device 11 be mountable and dismountable within the approved diameter range of the wire electrode 16 for easy exchange.

More specifically, a holder member 19 with an L-shaped cross section is mounted on the tip of the lower arm 15. The lower wire guide device 11 is interchangeably mounted on the holder member 19 in a freely mountable and dismountable manner. Specifically, a flat plate 21 is installed on the holder member 19 by means of a plurality of bolts 23. On the plate 21, there is provided two semicircular nozzle bodies 25A, 25B of the lower wire guide device 11. One nozzle body 25A is fixed thereto by a plurality of bolts 27.

As shown in FIG. 2, a plurality of pins 29 are mounted on the nozzle body 25A so that they project horizontally. A screw section 29A is formed on the tip of each pin 29. By screwing a box nut 31 which engages the screw section 29A onto the screw section 29A of the pin 29, the other nozzle body 25B is paired and integrated with the nozzle body 25A.

A hollow chamber 33 is formed in the inside sections of the nozzle body 25A and the nozzle body 25A, as shown in FIG. 1 and FIG. 2. A contacting member 35, which contacts and supply electrical power to a fine wire electrode 43 of a smaller than normal diameter, a wire guide 37 which guides the fine wire electrode, and a guide pulley 39, are provided on the nozzle body 25A in the hollow chamber 33. The guide pulley 39 is mounted in a freely rotatable manner on the nozzle body 25A by a bolt 41.

As shown in FIG. 1, a communication aperture 45 for the fine wire electrode 43, which communicates with the hollow chamber 33 to allow the fine wire electrode 43 to pass through, is formed on the upper portions of the nozzle bodies 25A, 25B. In addition, a process liquid supply orifice 47 is formed at a suitable position on the plate 21, specifically, on the left side in FIG. 1. A process liquid supply orifice 49 which communicates with the process liquid supply orifice 47 is formed in the holder member 19. Therefore, when the process liquid is supplied to the process liquid supply orifice 47 by a pump (omitted from the drawings), the process liquid passes through the process liquid supply orifice 47 and the hollow chamber 33, and then it is jetted from the aperture 45 to the discharge process area of the workpiece W to be used in the discharge process.

A support shaft 55 is supported in a cantilever manner on a perpendicular part 19A of the holder member 19 a. A roller 53, on which the belt 17 is stretched, is supported in a freely rotatable manner on the support shaft 55. Accordingly, the wire electrode which passes from the lower wire guide device 11 through a transit orifice 52 onto the belts 17 is transported to a recovery box B by the belts 17.

A bracket 58 is detachably mounted on the holder member 19 through a plurality of bolts 54. A suitable clutch mechanism 56, such as, for example, a dog clutch, and a freely connectable shaft 51 are rotatably supported on the bracket 58. Accordingly, when the roller 53 is rotated by the belt 17, the shaft 51 is rotated by means of the roller 53.

A helical gear 57 is mounted on the shaft 51. A helical gear 59 provided on a shaft 63, which is rotatably supported on a bracket 61 integrated with the bracket 55, engages with the helical gear 57. A wind-up roller 65, which transports the fine wire electrode 43 passing over the guide roller 39, is mounted on the shaft 63.

On the other hand, on the bracket 61, there is rotatably supported an eccentric shaft 67, which is different from the shaft 63, around the upper position of the shaft 63 in FIG. 1. On the eccentric section of the eccentric shaft 67, there is provided a pinch roller 69 which interposedly supports the fine electrode 43A between the wind-up roller 65 and itself. In order to impart tension uniformly to the fine wire electrode 43 by biasingly abutting the pinch roller 69 against the wind-up roller 65, as shown in FIG. 2, a torsion spring 71 is mounted on the shaft 67 via a pin 73.

In addition, freely rotatable eccentric shaft 75 is supported on the bracket 61. On the eccentric portion of the eccentric shaft 75, a swinging pulley 77 is rotatably supported. On one end of the eccentric shaft 75, as shown in FIG. 2 and FIG. 3, a gear 79 is mounted. The gear 79 engages with an intermediate speed reducing gear 83 which is mounted on a freely rotatable shaft 81 supported on the bracket 61. A large diameter gear 87 is integrally provided on the speed reducing gear 83. The large diameter gear 87 engages with a gear 85 mounted on the shaft 63. Accordingly, the eccentric shaft 75 is linked to the shaft 63 and rotated together.

A fluid clutch 89 is mounted on the right hand side of the shaft 51 in FIG. 1. A wind-up reel 91 supported in a freely rotatable manner on the shaft 51 is mounted on the left side of the fluid clutch 89. The wind-up reel 91 functions to dispose the fine wire electrode 43 by winding-up the electrode, which is positioned below the swinging pulley 77.

With the configuration describe above, when the fine wire electrode 43 is to be used, the upper and lower wire guide devices 9, 11 are changed to accommodate the fine wire electrode, or, depending on conditions for common use. The fine wire electrode 43 is then pulled out from the wire electrode supply section 14 and is inserted into the upper wire guide device 9, the workpiece W, and the lower wire guide device 11, in turn. The fine wire electrode 43 from the guide roller 39 of the lower wire guide device 11 is then led between the wind-up roller 65 and the pinch roller 69 and wound onto the take-up reel 91 via the swinging pulley 77 to complete the preparations for the electric discharge process on the workpiece W.

Following these preparations, the motor is driven to start the discharge process on the workpiece W, and the belts 17 runs, causing the roller 53 to turn. The rotation of the roller 53 is transmitted through the clutch mechanism 56 to the shaft 51 and the helical gear 57, then is further transmitted through the helical gear 59 to the shaft 63. The rotation of the shaft 63 is transmitted to the wind-up roller 65, and the rotation of the wind-up roller 65 then causes the fine wire electrode 43 to be transported by the wind-up roller 65 and the pinch roller 69.

In addition, the rotation of the shaft 63 is transmitted to the eccentric shaft 75 through the gears 85, 87, 83, and 79, causing the eccentric shaft 75 to rotate. The swinging pulley 77 mounted on the eccentric part of the eccentric shaft 75 then moves eccentrically.

When the eccentric shaft 75 moves eccentrically, the position at which the fine wire electrode 43 is sent forward changes relative to the take-up reel 91, and the fine wire electrode 43 is uniformly taken up on the take-up section of the take-up reel 91.

On the other hand, because the take-up reel 91 is connected to the shaft 51 through the fluid clutch 89, it rotates in proportion with the amount that the fine wire electrode 43 is sent forward and rotates in the same direction as the shaft 51 with an extremely weak force. As a result, the fine wire electrode 43 is not fed out at a force greater than the tension of the wire and is taken up on the take-up reel 91 at a weak wind-up force.

As stated above, since the wire electrode 43 is taken up by the wire take-up device 18 provided adjacent to the lower guide device 11, it is possible to eliminate the fluctuations in tension of the fine wire electrode 43, and, since a take-up device which is not intended exclusively for use with a normal wire electrode is set, it becomes possible to eliminate wire breakage. Further, since the take-up heel 91 of the wire take-up device 18 can take up the fine wire electrode 43 with a force weaker than the tension on the fine wire electrode 43 and without non-uniform rotation occurring, by the provision of the fluid clutch 87, there is no tendency for the wire electrode to break.

Also, because the wire take-up device 18 is driven through the belt 17 by a motor placed outside of the process liquid tank 7, it is not necessary to protect the motor from the process liquid and the motor can be used in common, so that the configuration becomes simple.

The present invention is not limited by the embodiment outlined above. By suitable changes the embodiment of the invention can be implemented in another mode. For example, in the case where the wire cutting electric discharge process is carried out by using a normal wire electrode with a diameter of 0.1 mm or greater, the lower wire guide device 11 can be changed to a lower wire guide device for use with a normal wire electrode or, according to the situation, can be used as it is by leading the wire electrode between the belts 17, a normal electric discharge process can be carried out. Accordingly, by mounting the wire take-up device 18 on the lower arm 15 of the conventional wire cutting electric discharge device, the wire cutting electric discharge process can be carried out with either the conventional normal wire electrode or with the fine wire electrode.

INDUSTRIAL APPLICABILITY

As can be understood from the foregoing explanation of an embodiment of the present invention, according to the present invention, it is easily possible to improve the precision of the wire cutting electric discharge process when using a fine wire electrode with a smaller diameter for a conventional wire cutting electric discharge machine for a normal wire electrode by mounting the wire take-up device adjacent to the lower wire guide device on the conventional wire cutting electric discharge machine. Accordingly, the present invention is extremely advantageous as a wire cutting electric discharge machine when it is desired to be able to select both the discharge process using a normal wire electrode and the discharge process using a fine wire electrode.

What is claimed is:

1. A wire cutting electric discharge machine comprising:
    a frame;
    a workpiece support table for supporting a workpiece;
    an upper wire guide device supported on the frame at a position above the workpiece; and
    a lower wire guide device supported on a lower arm provided on the frame at a position below the workpiece;
    wherein an electric discharge is produced between a wire electrode guided by the upper and lower wire guide devices and the workpiece, and the wire electrode is moved relative to the workpiece and an electric discharge process is performed on the workpiece;
    and wherein the wire cutting electrical discharge machine comprises:
    a wire electrode disposal device provided with a lower arm for disposing the wire electrode by taking up or winding up the wire electrode when an electric discharge process is performed on the workpiece using a wire electrode of normal diameter; and
    a wire take-up device, for taking up a fine wire electrode, which can be coupled to a wire electrode handling device, for use when an electric discharge process is performed on the workpiece using a fine wire electrode of a less than normal diameter.

2. The wire cutting electric discharge machine of claim 1, wherein the wire take-up device is provided adjacent to the lower wire guide device, and, in the wire take-up device, a take-up reel which takes up a fine wire electrode is rotated through a fluid clutch, and the winding force of the take-up reel is weaker than the tension of the fine wire electrode.

3. The wire cutting electric discharge machine of claim 1 or claim 2, wherein the wire take-up device is unitized and can be mounted on and dismounted from the lower arm.

* * * * *